Jan. 10, 1956 C. C. WINTER 2,729,891
COMPASS INSTRUMENT FOR MEASURING AND MARKING UNEVEN SURFACES
Filed March 2, 1953 2 Sheets-Sheet 1
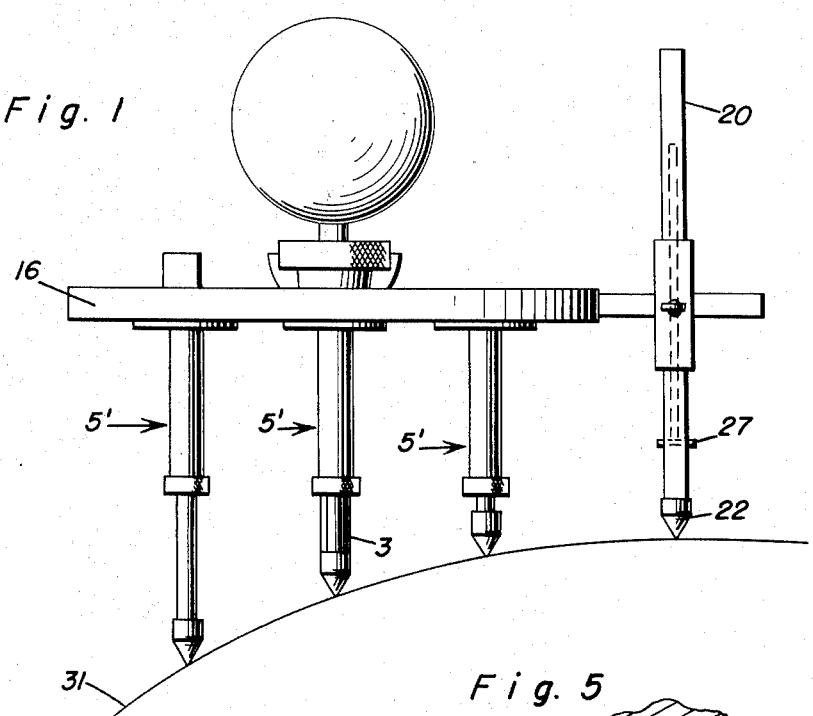
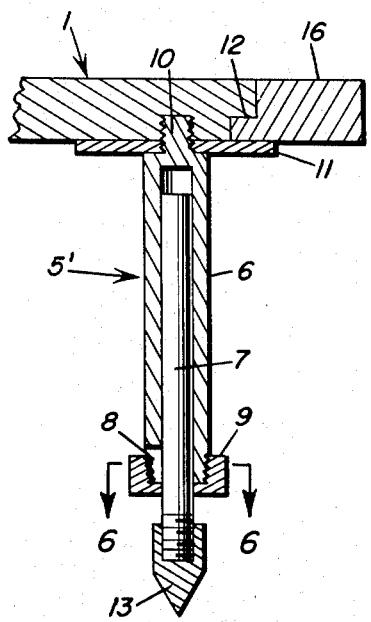
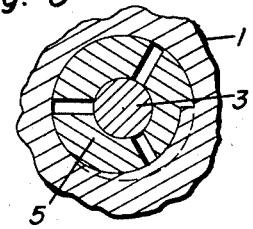
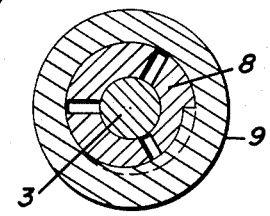
Cecil C. Winter, *Inventor*
By *Clarence A. O'Brien and Harvey B. Jacobson*
Attorneys Jan. 10, 1956 C. C. WINTER 2,729,891
COMPASS INSTRUMENT FOR MEASURING AND MARKING UNEVEN SURFACES
Filed March 2, 1953 2 Sheets-Sheet 2
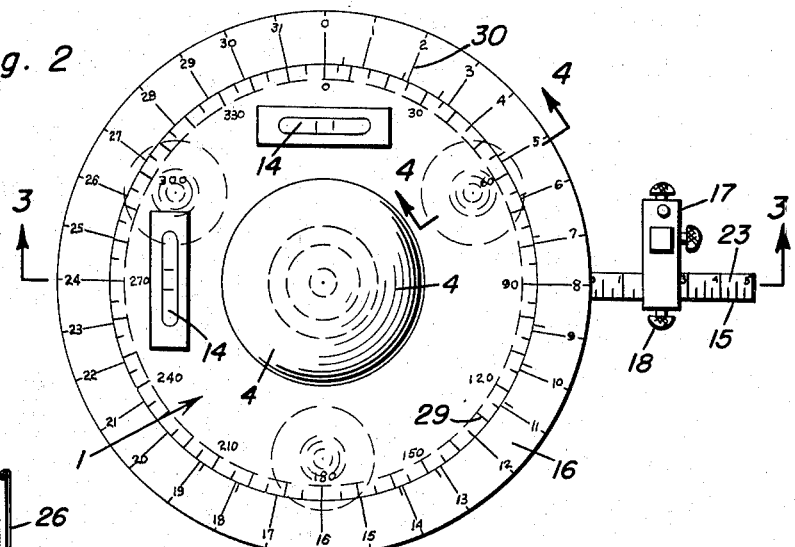
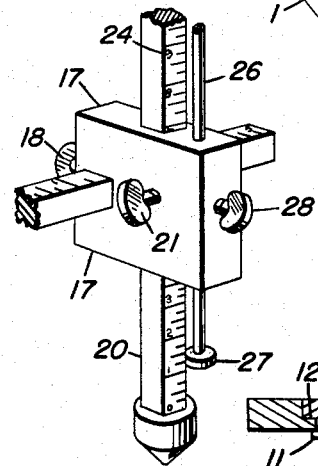
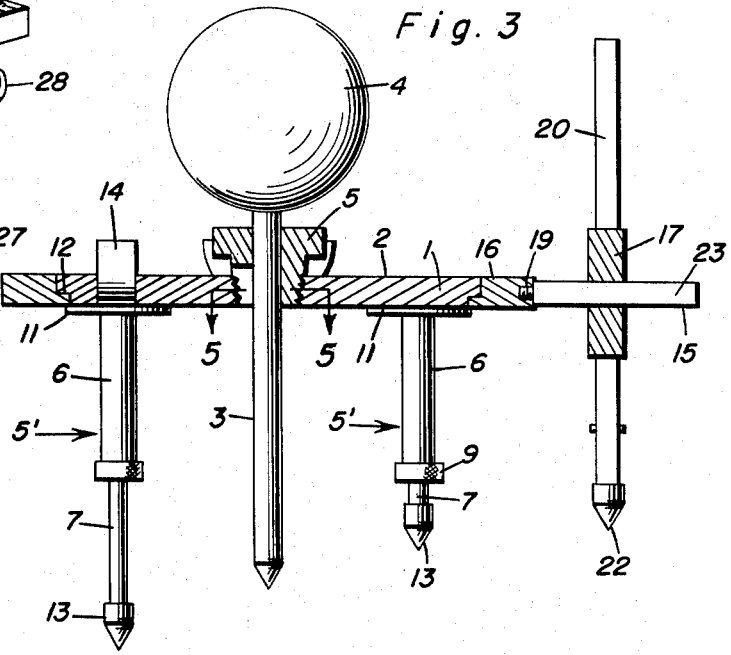
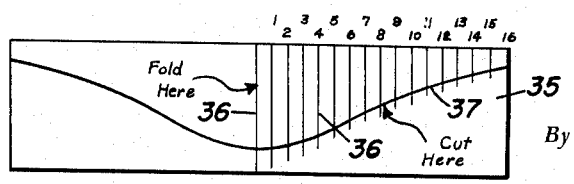
Cecil C. Winter, Inventor
By Clarence A. O'Brien and Harvey B. Jacobson
Attorneys United States Patent Office 2,729,891
Patented Jan. 10, 1956

2,729,891

COMPASS INSTRUMENT FOR MEASURING AND MARKING UNEVEN SURFACES

Cecil C. Winter, South Charleston, W. Va.

Application March 2, 1953, Serial No. 339,518

2 Claims. (Cl. 33—21)

My invention relates to improvements in compass instruments for measuring and marking uneven surfaces for pattern making to fit the ends of pipe or the like to the surface.

The primary object of my invention is to provide a simply constructed instrument for projecting a circle on the surface to which a pipe end, or the like, is to be fitted, and obtaining measurements for which a pattern may be made to cut the pipe end for fitting the surface at the marked area.

Another object is to provide an instrument of the character and for the purpose specified which is accurate, easy to handle, and otherwise adapted as an efficient labor saving device in obtaining measurments for pattern making for the purpose indicated.

Other and subordinate objects, within the purview of my invention, together with the precise nature of my improvements will be readily understood when the succeeding description and claims are read with reference to the drawings accompanying and forming part of this specification.

In said drawings:

Figure 1 is a view in side elevation of my improved instrument illustrating its use in marking and measuring a spherical surface;

Figure 2 is a view in plan of the instrument;

Figure 3 is a view in transverse section taken on the line 3—3 of Figure 2;

Figure 4 is a fragmentary enlarged view taken on the line 4—4 of Figure 2;

Figure 5 is an enlarged fragmentary view in horizontal section taken on the line 5—5 of Figure 3;

Figure 6 is an enlarged fragmentary view in horizontal section taken on the line 6—6 of Figure 4;

Figure 7 is a fragmentary view in perspective of a portion of the compass beam, the stylus, the stylus holder, and other parts associated with the stylus, and Figure 8 is a view of the pattern.

Referring to the drawings by numerals, the instrument of my invention, in the preferred illustrated embodiment, comprises a head disk 1 having a top 2 graduated as presently described. The disk 1 is provided with an axial, pointed center pin 3 having an upper end spherical handle 4 fixed thereon above the disk 1. A split resilient nut 5 on the pin 3, through which the pin 3 slidably extends, is threaded into the disk 1 into compressed gripping relation to the pin 3 to hold said pin in selected longitudinally adjusted positions.

A series of three telescopic supporting legs 5' for the disk 1 are spaced equidistantly around said disk at the edge thereof, each leg comprising an upper tubular section 6 and a lower rod section 7 vertically adjustable in the upper section 6 and held in adjusted position by a lower split end 8 on the upper section 6 compressed into gripping relation to the lower section 7 by a nut 9 threaded onto said end 8. Each upper section 6 is attached to the disk 1 by a reduced threaded end 10 turned into the disk 1 through a washer 11 clamped against the bottom of the disk 1 by the upper end of the section 6. The washers 11 project outwardly beyond the bottom of a circumferential edge groove 12 in the disk 1 for a purpose presently seen. The lower sections 7 of the legs 5' are provided with enlarged, sharp pointed lower end members 13 for biting into a surface to hold the disk 1 against displacement edgewise on an uneven surface.

Spirit levels 14 are provided on the top 2 of the disk 1 each between two of the legs 5' for leveling the disk 1 into horizontal position on a surface.

A compass beam 15 is mounted radially to the disk 1 by a flat, internally flanged ring 16 fitting in the groove 12 and rotatable on the washers 11 for setting around the disk 1 to correspondingly rotate and set the beam 15. The beam 15 carries a rectangular stylus holder 17 settable along said beam with a locking set screw 18 therein. The beam 15 has a reduced end 19 threaded into the ring 16 to secure said beam to said ring.

A stylus 20 is vertically adjustable, slidably, in the holder 17 and said holder is provided with a set screw 21 therein for locking the stylus in vertically adjusted position. The stylus 20 is provided with a pointed lower end soapstone member 22 for marking purposes. The beam 15 is graduated in inches, as at 23, the graduations being numbered from zero outwardly from the ring 16 for adjusting the holder 17 and stylus 20 outwardly of the ring 16 for scribing circles of larger radius as desired. The stylus 20 is graduated in inches, as at 24, and said graduations are numbered upwardly from zero at the member 22 for a purpose presently clear.

A gauge rod 26 extends vertically through the holder 17 alongside the stylus 20 with a lower end index disk 27 thereon against which the graduations 24 may be read. The gauge rod 26 is vertically adjustable in the holder 17 and adapted to be locked in adjusted position therein by a set screw 28. The disk 1 has its top 2 graduated, as at 29, around the edge thereof, the graduations 29 being numbered and arranged in the degrees of a circle. The ring 16 has its top inner edge graduated, as at 30, and numbered preferably in accordance with the degrees of a compass.

Referring now to one illustrative use and operation of the invention. Let it be assumed that the end of a pipe, not shown, is to be fitted to a spherical surface of a dome, indicated at 31 in Figure 1, and offset from the axis of the dome. With the stylus 20 adjusted in the holder 17 to read zero at the index disk 27, the instrument is placed by the handle 4 on the dome 31 with the center pin 3 in the center of a hole to be cut in the dome, and the nuts 9 are loosened so that the disk 1, ring 16 and beam 15 may be levelled into horizontal position, as indicated by the levels 14, and through sliding adjustment of the lower sections 7 of the legs 5' in the upper sections 6 of said legs. The nuts 9 are then tightened to hold said disk, ring 16 and beam 23 in horizontal position. Preferably one leg 5' is positioned on the dome 31 at approximately the high point beneath the disk 1. The stylus 20 is then adjusted along the beam 23 according to the radius of the pipe to be fitted to the dome 31 and revolved to the deepest point on the dome 31 below the disk 1 at which point set screw 21 is loosened so that the stylus 20 will gravitate in the holder 17 to lower the member 22 against said dome. At this point, if any one of the major graduations 30 on the ring 16 does not register with one of the major graduations 29 on the disk 16, the disk 16 should be rotatably adjusted relative to the ring 16 until such registration occurs. The instrument is now set for plotting a pattern for cutting the end of the pipe and on a strip of paper 35 corresponding in length to the circumference of the pipe to be cut, which may be computed in the usual manner. The strip of paper 35 is marked transversely from the center thereof to one end with a selected even number of equidistantly spaced lines 36, the lines 36 extending from one longitudinal edge of the strip of paper at a right angle thereto. The center line 36 is then pointed off from said edge in accordance with the depth measurement indicated by the graduation 24 on the stylus 20 at the index disk 27. The stylus 20 is then revolved around the disk 1 180° a number of equidistant steps corresponding to the number of the remaining lines 36 on the strip of paper 35, the steps being determined by registering successive graduations 30 on the ring 16 with the graduations on the disk 3 from which the ring 16 is started, and whereby to obtain successive depth measurements on the stylus 20 for pointing off the remaining lines 36 on the strip of paper 35 and from said edge of the strip a distance corresponding with successive depth measurements obtained by the stylus 20. As will be understood, the depth measurements correspond to the degree of vertical play of the stylus 20 at the end of each step. A contour line 37 is then drawn longitudinally on the strip of paper 35 to intersect the lines 36 where the same are pointed off and this line provides a pattern for cutting one-half of the end of the pipe. By folding the strip of paper 35 along the transverse center line and cutting the same along the contour line 37 the entire pattern will be obtained, as will be clear. By revolving the stylus 24 a complete revolution, the dome 31 is marked for cutting a hole in the dome 31 around which cut end of the pipe will fit flush against the surface of the dome.

The gauge rod 26 is adjustable for accuracy in reading the graduations 24, as the member 22 on the stylus 20 wears down.

The described degree graduations 29, 30 provide for rotating the stylus 20 in equidistant steps varying widely in degree, and starting with the disk 1 and ring 16 in substantially any angular position with respect to each other.

The foregoing will, it is believed, suffice to impart a clear understanding of my invention, without further explanation.

Manifestly, the invention, as described, is susceptible of modification, without departing from the inventive concept, and right is herein reserved to such modifications as fall within the scope of the appended claims.

Having described the invention, what is claimed as new is:

1. An instrument for projecting a circle on an uneven surface and taking depth measurements of the surface at different points comprising a disk having a graduated edge, legs spaced around said disk and supporting said disk on said surface and telescopically adjustable to adjust the disk into horizontal position, right angularly related spirit levels on said disk for indicating when said disk is horizontal, a graduated ring surrounding the edge of the disk and supported by said legs for rotation around the axis of the disk to register the graduations on the ring with the graduations on the disk, a radial graduated compass beam on the ring, a graduated stylus, and a mounting for the stylus slidable on the beam to register with the graduations on the beam and having the stylus vertically adjustable therein at one side of the beam, a centering pin extending through said disk for centering the disk and legs on said surface and having a hand grip knob thereon above said disk, and a clamp in said disk in which said centering pin is vertically adjustable and which is rotatable in the disk to clampingly retain said centering pin in adjusted position.

2. The combination according to claim 1, and a gauge rod vertically slidable on said mounting alongside and parallel with the stylus with a lower index member thereon against which the graduations on the stylus may be read.

References Cited in the file of this patent

UNITED STATES PATENTS

| | | |
|---|---|---|
| 295,093 | Ashcroft | Mar. 11, 1884 |
| 1,286,770 | Rashkovsky | Dec. 3, 1918 |
| 1,307,076 | Bernard | June 17, 1919 |
| 2,249,906 | Longoria | July 22, 1941 |
| 2,474,041 | Dimmock | June 21, 1949 |
| 2,547,320 | Hedley | Apr. 3, 1951 |
| 2,559,966 | Joseph | July 10, 1951 |
| 2,677,181 | Sury | May 4, 1954 |

FOREIGN PATENTS

| | | |
|---|---|---|
| 120,791 | Sweden | Feb. 3, 1948 |